United States Patent
John et al.

(10) Patent No.: US 11,343,793 B1
(45) Date of Patent: May 24, 2022

(54) PAGING PRIORITY AND WIRELESS ACCESS FOR NON-HIGH PRIORITY ACCESS USERS DURING WIRELESS NETWORK CONGESTION

(71) Applicant: Verizon Patent and Licensing Inc., Basking Ridge, NJ (US)

(72) Inventors: Toby Varughese John, Murphy, TX (US); Frank Jager, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 6 days.

(21) Appl. No.: 17/115,203

(22) Filed: Dec. 8, 2020

(51) Int. Cl.
| | |
|---|---|
| *H04W 4/21* | (2018.01) |
| *H04W 68/00* | (2009.01) |
| *H04W 76/11* | (2018.01) |
| *H04W 76/14* | (2018.01) |
| *H04W 4/90* | (2018.01) |
| *H04W 48/16* | (2009.01) |
| *H04W 76/27* | (2018.01) |
| *H04W 28/02* | (2009.01) |

(52) U.S. Cl.
CPC ........... *H04W 68/005* (2013.01); *H04W 4/90* (2018.02); *H04W 28/0284* (2013.01); *H04W 48/16* (2013.01); *H04W 76/11* (2018.02); *H04W 76/14* (2018.02); *H04W 76/27* (2018.02)

(58) Field of Classification Search
None
See application file for complete search history.

*Primary Examiner* — Gary Lafontant

(57) ABSTRACT

A method for paging priority and wireless access which includes receiving, at a base station and from a core network, a paging message associated with a priority connection from a first user equipment device (UE) having an elevated priority status, to a second UE having a non-elevated priority status. The method further includes determining, at the base station, that non-elevated priority wireless access channels are congested, detecting, at the base station, a priority indicator within the received paging message in response to determining that the non-elevated priority wireless access channels are congested. The method further includes caching, at the base station, an identifier of the second UE in response to detecting the priority indicator in the received paging message, and establishing a wireless connection between the first UE and the second UE upon verifying that the identifier of the second UE has been cached.

20 Claims, 11 Drawing Sheets

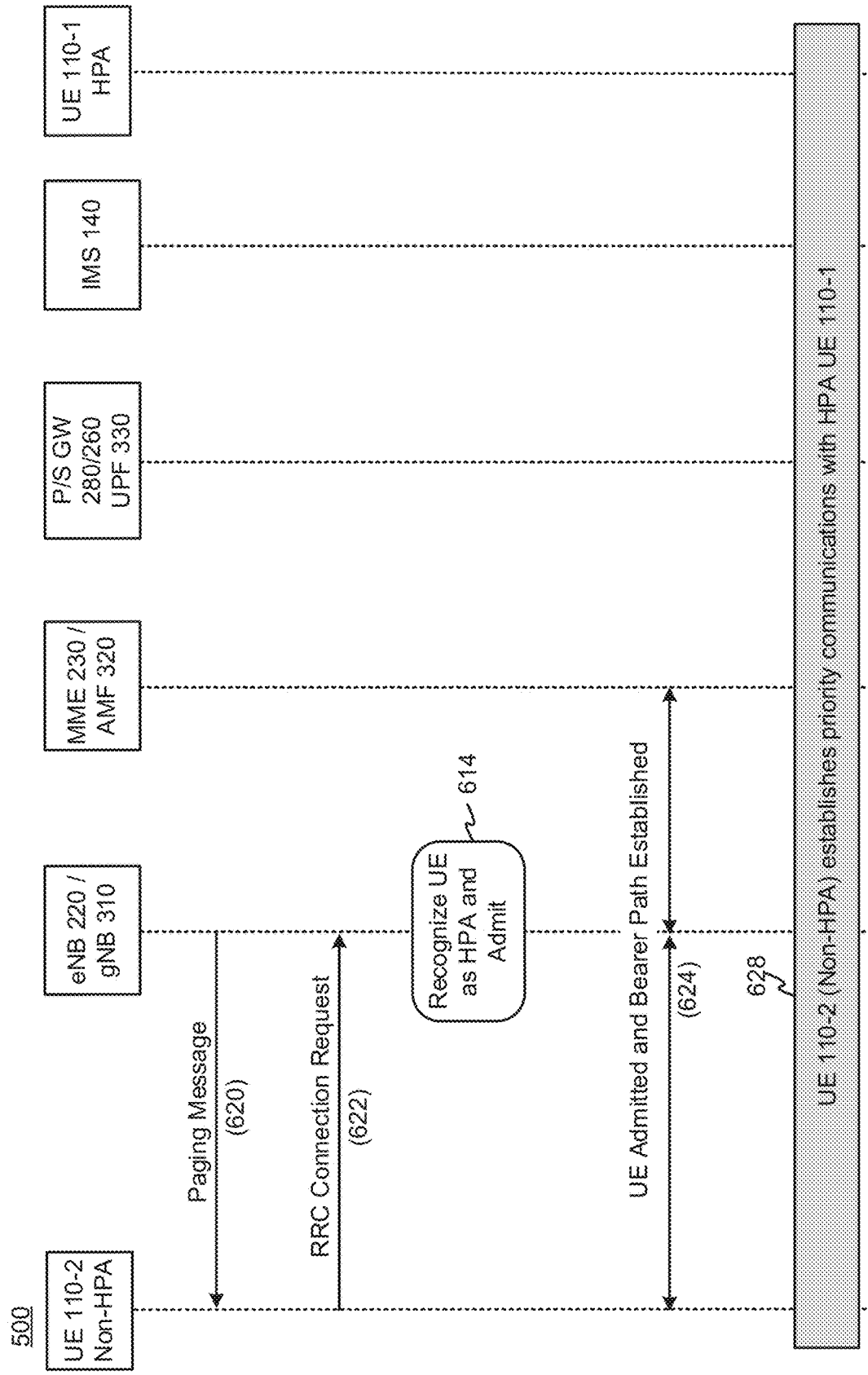

US 11,343,793 B1

PAGING PRIORITY AND WIRELESS ACCESS FOR NON-HIGH PRIORITY ACCESS USERS DURING WIRELESS NETWORK CONGESTION

BACKGROUND

Long Term Evolution (LTE) is an existing mobile telecommunications standard for wireless communications. Next Generation wireless networks, such as fifth generation (5G) networks, will provide increased capacity and speed. Both LTE and 5G networks will communicate with increasing numbers of Internet of things (IoT) and user equipment devices (UEs). Providing wireless priority services for national security and emergency preparedness, and for public safety subscribers, can present challenges as increasing numbers of UEs may create congestion in radio access networks.

BRIEF DESCRIPTION OF THE DRAWINGS

FIGS. 6A-6B are diagrams showing exemplary message flows within a wireless communication system for a RAN implemented paging of a UE having non-elevated priority during wireless network congestion;

DETAILED DESCRIPTION OF THE PREFERRED EMBODIMENTS

Figure 1:
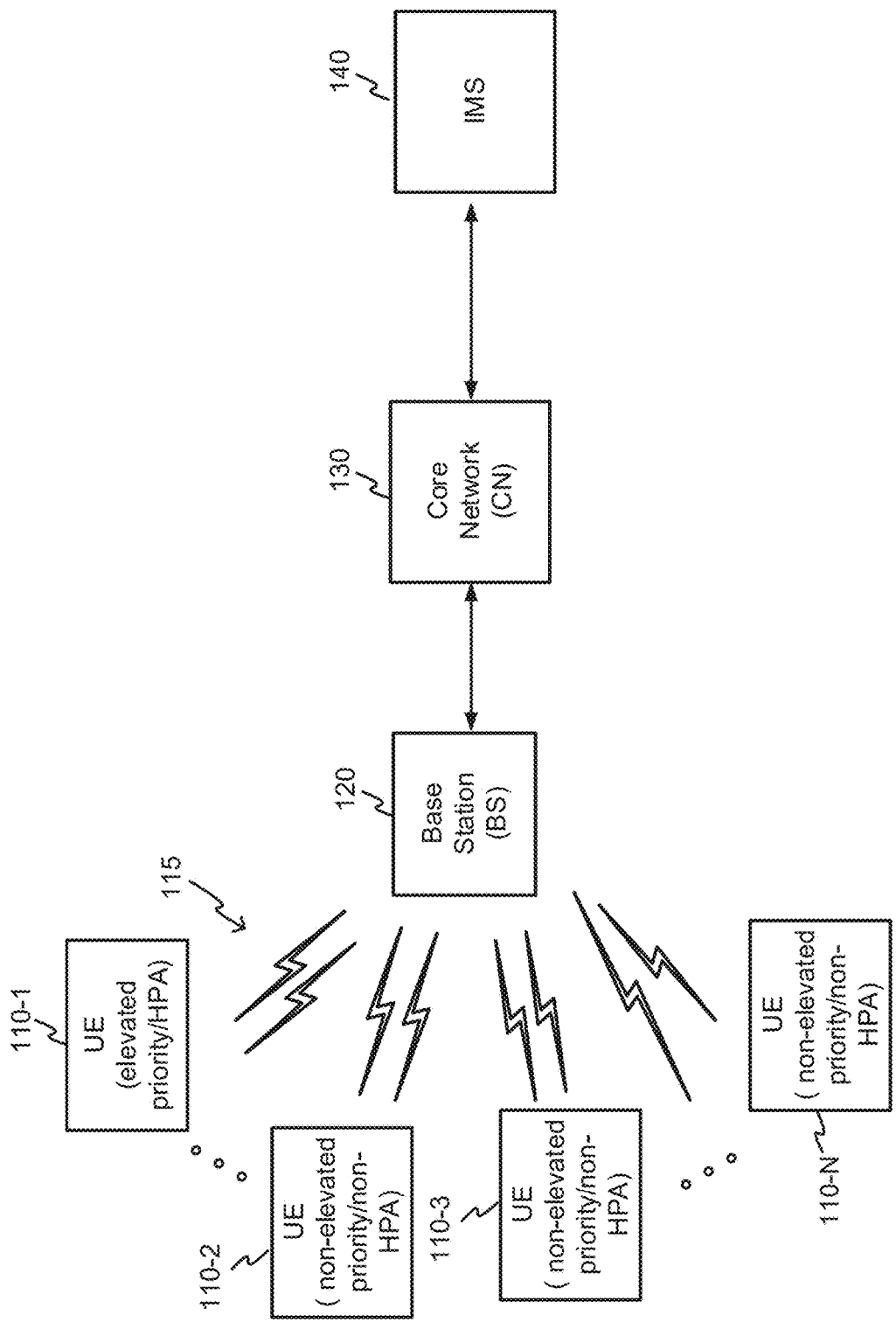
FIG. 1 is a diagram illustrating an exemplary wireless communication system consistent with an embodiment.

The following detailed description refers to the accompanying drawings. The same reference numbers in different drawings may identify the same or similar elements. The following detailed description does not limit the scope of the invention.

Telecommunication advancements have led to increases in the numbers and utilization of User Equipment devices (UE), including mobile communication handsets (e.g., smart phones) and Internet of things (IoT) devices. The increasing number of devices exchanging data with wireless networks can present risks affecting the performance and availability of different services. During an emergency and/or periods of high use, access to wireless connectivity may become restricted due to congestion on the wireless channels, and thus impact public safety and/or security.

For example, network operators in the United States currently support elevated priority services for National Security and Emergency Preparedness (NS/EP) and Public Safety subscribers, which include voice, data and other wireless communication services. Design and feature implementations deployed in many networks provide priority to NS/EP subscribers over normal users in the radio access network (RAN), evolved packet core (EPC), and in Internet Protocol multimedia systems (IMS). The access point for the UEs, which is the RAN, is the most susceptible part of the system to network overload (also referred to herein as "congestion"). Although many RAN advancements improved accessibility for NS/EP subscribers during an emergency or crisis, accessibility and capacity bottlenecks remain an issue for critical services.

Elevated priority services, which may include high priority services such as, for example, wireless priority services (WPS) and Public Safety services, may be subscribed services for prioritized accessibility to a cellular network. Third generation partnership project (3GPP) standards and network operators define access requirements for high priority subscribers to gain access to a cellular network in a crisis event where networks are congested. Current standards specifications, operator requirements and implementation present the following problem. During an emergency and network congestion scenario, when an elevated priority subscriber such as a high priority WPS or Public Safety subscriber, directs (e.g., terminates) a priority voice, data, or messaging connection (e.g., a call) to a subscribed user having normal priority, the connection may fail since no priority mechanisms are in place from the network or the responding device.

Embodiments presented herein may address connection issues. For example, one approach may propagate priority paging information from the RAN to a UE designated as recipient UE. The UE may decode the received information, temporarily elevate its priority status to increase accessibility to the network and session, and respond to the RAN with radio resource control (RRC) Connection Request designating an elevated priority (such as, for example, an establishment cause designating "highPriorityAccess" (HPA).

In another embodiment, logic may be added to a RAN element (e.g., a base station) which caches a parameter identifying the UE of pages having elevated priorities (e.g., herein referred to as "priority paging messages"). Upon receiving priority paging messages, UEs may send RRC connections requests in response, and if the identifier of the UEs match one of those cached identifiers, the UEs may be admitted to the network regardless of their Establishment cause (such as, for example "emergency," "highPriorityAccess," "mt-Access," "mo-Signalling," and/or "mo-Data").

FIG. 1 is a diagram illustrating an exemplary wireless communication system 100 consistent with an embodiment. As shown in FIG. 1, environment 100 may include user equipment devices (UEs) 110-1 to 110-N (referred to herein plurally, but not necessarily collectively or in their entirety, as "UEs 110", and individually as "UE 110-x"), a base station (BS) 120, a core network (CN) 130, and an IP multimedia subsystem (IMS) 140. UEs 110 may communicate over wireless channels with BS 120 via RAN 115 using any type of known cellular network, such as, for example, LTE, LTE Advanced, 5G, etc. UEs 110 may exchange data with CN 130 via BS 120 through one or more dedicated channels having varying levels of priority. In the example shown in FIG. 1, UE 110-1 may have an elevated priority status (e.g., "highPriorityAccess" (HPA)) and UEs 110-2 through 110-N may have a non-elevated priority status (e.g., non-HPA). CN 130 may further exchange data with IMS 140 via a backhaul network (not shown). Accordingly, through BS 120 and CN 130, UEs 110 may obtain access to IMS 140 for exchanging IP data using any application protocol, such as SIP.

UEs 110 may be in various states of connection with BS 120 via RAN 115. For example, some UEs 110 may have radio connections in an active state (e.g., radio resource connection (RRC) active) where data may be exchanged, and other UEs 110 may have idle radio connections (e.g., RRC idle). Thus, when in RRC idle mode, UE 110 does not have an active communication path to RAN 115 or CN 130. Paging procedures address this issue by alerting or paging the idle UE 110 to re-establish a radio connection and bearer path with the wireless network. The 3GPP Technical Specification 36.413 defines an attribute for CN 130 elements, such as the 4G mobility management entity (MME) or 5G access and mobility management function (AMF) used to prioritize a paging message of an RRC idle UE. Within a paging message sent from CN 130 to RAN 115, a paging priority parameter may indicate the priority of the paging message. The paging priority parameter may have, for example, eight defined levels. Critical subscribers (also referred to herein as "elevated priority subscribers") such as, for example, first responders, public utilities, law enforcement or other government entities can utilize available critical priority services (such as, for example, mission critical push to talk (MC-PTT), data, messaging and/or multimedia priority services (MPS)) on a subscribed basis. In conventional networks, paging priority only works as expected if the originating and terminating parties are both subscribed to critical services. When an originating critical subscriber calls a non-priority subscriber, a paging message which originates at the MME or AMF will still have the paging priority indicator. However, due to current standards and implementation, the base station 120 removes the paging priority indicator before sending the paging message to the non-elevated priority UE 110. During network congestion, critical subscribers in the field may be required to communicate to non-elevated priority (e.g., "normal") subscribers. When an elevated priority subscribed user originates an elevated priority call to an RRC-idle Public/normal non-elevated user, the elevated priority paging message may be delivered. In response to the paging message, the non-elevated priority user attempts to connect to the congested cell and the call will likely fail since the RAN is in a congested state. This results in a communication failure for a critical service user such as WPS or First Responder agents in the field.

Embodiments described herein may address connection issues with the following approaches. In one embodiment, a capability may be added to a RAN element (e.g., base station 120) which provides for caching a parameter identifying UE 110 for paging messages having elevated priorities (e.g., herein referred to as "priority paging messages"). Upon receiving priority paging messages, UEs 110 may send RRC connections requests in response, and if the identifier of the UEs 110 match those cached in base station 120, UEs 110 may be admitted to the network regardless of their Establishment cause. In another embodiment, the RAN (e.g., base station 120) may propagate paging information to UE 110 which is the recipient of the paging message. Upon receiving the paging message, UE 110 may decode the received information, temporarily elevate the priority status of UE 110 to increase accessibility to the network and session, and respond to the RAN with an RRC Connection Request designating an elevated priority (such as, for example, an establishment cause designating "highPriorityAccess" (HPA)).

Further referring to FIG. 1, UEs 110 may include any device with long-range (e.g., cellular or mobile wireless network) wireless communication functionality. For example, UEs 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer, or a digital media player (e.g., Apple TV®, Google Chromecast®, Amazon Fire TV®, etc.); a smart television; a portable gaming system; a global positioning system (GPS) device; a home appliance device; a home monitoring device; and/or any other type of computer device with wireless communication capabilities and a user interface. UE 110 may also include any type of customer premises equipment (CPE) such as a set top box, a wireless hotspot (e.g. an LTE or 5G wireless hotspot), a femto-cell, etc. UE 110 may include capabilities for voice communication, mobile broadband services (e.g., video streaming, real-time gaming, premium Internet access etc.), best effort data traffic, and/or other types of applications.

In some implementations, UEs 110 may communicate using machine-to-machine (M2M) communication, such as machine-type communication (MTC), a type of M2M communication standardized by the $3^{rd}$ Generation Partnership Project (3GPP), and/or another type of M2M communication. UEs 110 may be embodied as IoT devices, which may include health monitoring devices, asset tracking devices (e.g., a system monitoring the geographic location of a fleet of vehicles, etc.), sensors (e.g., utility sensors, traffic monitors, etc.)

BS 120 and CN 130 provide access to IMS 140 for providing multimedia IP services to UEs 110. Such services may include mobile voice service (e.g., various forms of voice over Internet Protocol (VoIP)), short message service (SMS), multimedia message service (MMS), multimedia broadcast multicast service (MBMS), Internet access, cloud computing, and/or other types of data services. While not shown, BS 120 and CN 130 may further provide additional access to a wide area network (WAN) not shown for other IP and/or non-IP data delivery (NIDD) services.

In some implementations, BS 120 and CN 130 may include Long Term Evolution (LTE) and/or LTE Advance (LTE-A) capability, where BS 120 may include as an eNodeB, and CN 130 may include as an evolved packet core (EPC) network. Alternatively, in other implementations, BS 120 and CN 130 may include 5G access capability, where BS 120 may include a next generation Node B (gNodeB), and CN 130 may serve as a 5G packet core (5G PC) network. Such implementations may include functionality such as 5G new radio (NR) base stations; carrier aggregation; advanced or massive multiple-input and multiple-output (MIMO) configurations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology.

IMS 140 may include one or more devices, such as computer devices, databases, and/or server devices, that facilitate IP data delivery services. Such services may include supporting IoT applications such as alarms, sensors, medical devices, metering devices, smart home devices, wearable devices, retail devices, etc. Other services may include supporting other communications applications (e.g., SMS, etc.), automotive applications, aviation applications, etc. IMS 140 may communicate with UEs 110 over BS 120 and CN 130 using IP and/or non-IP bearer channels.

Although FIG. 1 shows exemplary components of wireless communication system 100, in other implementations, wireless communication system 100 may include fewer components, different components, differently arranged components, or additional components than depicted in FIG. 1. Additionally or alternatively, one or more components of wireless communication system 100 may perform functions described as being performed by one or more other components of wireless communication system 100.

Figure 2:
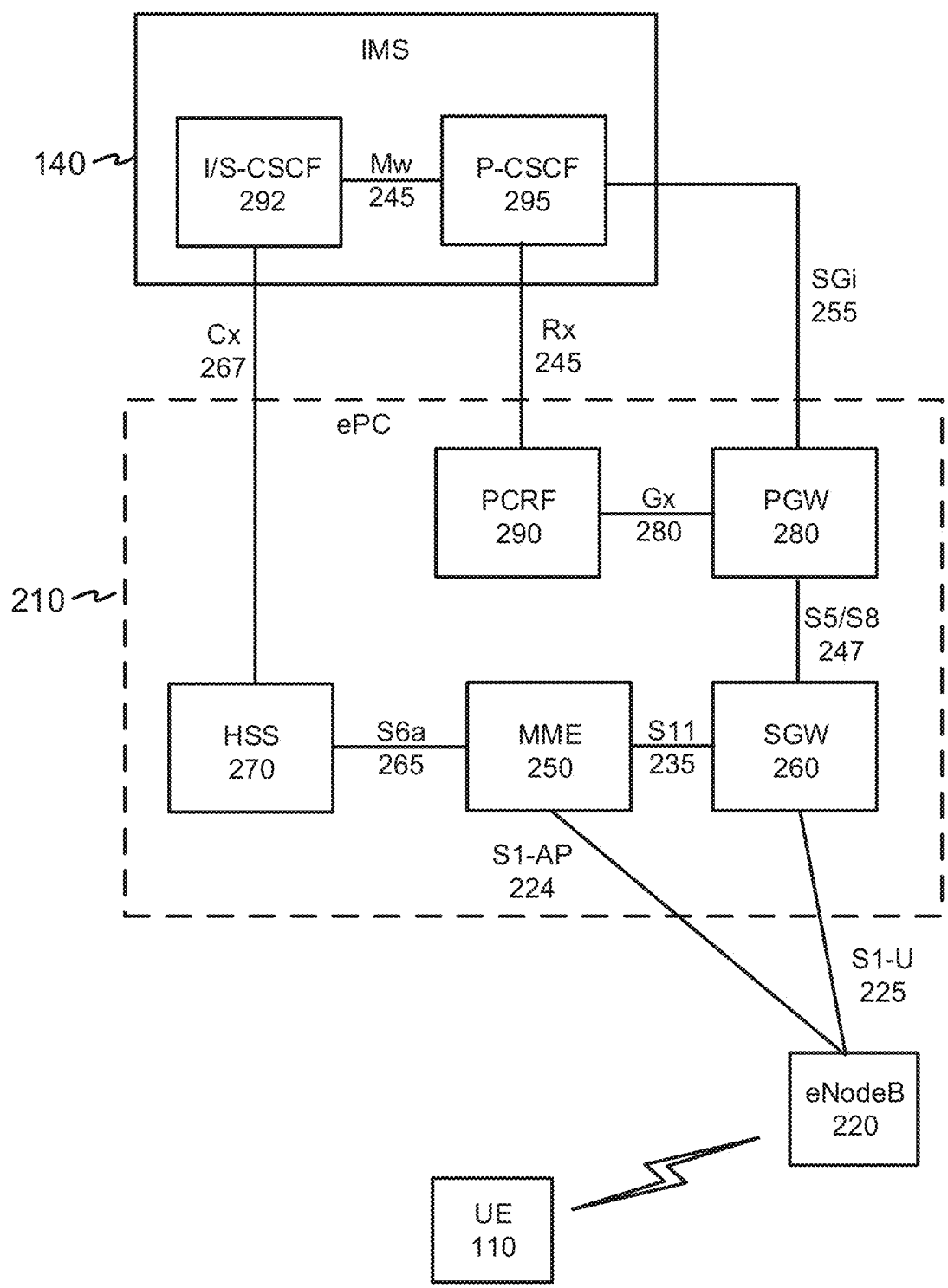
FIG. 2 is a block diagram of an exemplary wireless communication system having a radio access network based on an LTE standard.

FIG. 2 is a block diagram of an exemplary wireless communication system 200 based on the LTE standard. Wireless communication system 200 may include an LTE network with an evolved Packet Core (ePC) 210 and eNodeB 220 (corresponding, for example, to CN 130 and BS 120, respectively). UE 110 and eNodeB 220 may exchange data over a radio access technology (RAT) based on LTE air channel interface protocols. In the embodiment shown in FIG. 2, EPC 210 may operate in conjunction with an evolved Universal Mobile Telecommunications System (UMTS) Terrestrial Network (eUTRAN) that includes at least one eNodeB 220. Wireless communication system 200 may further include an IP network and/or a non-IP network. Such networks may be embodied separately or included in a backhaul network and/or in a wide area network (not shown). EPC 210 may also be connected to subsystems in IMS 140.

EPC 210 may include one or more devices that are physical and/or logical entities interconnected via standardized interfaces. EPC 210 provides wireless packet-switched services and wireless packet connectivity to UEs 110 to provide, for example, data, voice, and/or multimedia services. EPC 210 may further include a mobility management entity (MME) 250, a serving gateway (SGW) 260, a home subscriber server (HSS) 270, a packet data network gateway (PGW) 280, and a Policy and Charging Rules Function (PCRF) 290. It is noted that FIG. 2 depicts a representative networking system 200 with exemplary components and configuration shown for purposes of explanation. Other embodiments may include additional or different network entities in alternative configurations than which are exemplified in FIG. 2. For example, IMS 140 may communicate with ePC 210, and include various call session control functions (CSCF), which may include interrogating/serving CSCF 292 (I/S CSCF), and proxy CSCF 295 (P-CSCF). I/S-CSCF 292 and P-CSCF 295 may exchange information using an Mw interface 245 using session initiation protocol (SIP).

Further referring to FIG. 2, eNodeB 220 may include one or more devices and other components having functionality that allows UE 110 to wirelessly connect via the RAT of eNodeB 220. eNodeB 220 may interface with ePC 210 via a S1 interface, which may be split into a control plane S1-AP interface 224 and a data plane S1-U interface 225. EnodeB 220 may interface with MME 250 via S1-AP interface 224, and interface with SGW 260 via S1-U interface 225. S1-U interface 225 may be implemented, for example, using GTP. S1-AP interface 224 may be implemented, for example, with a protocol stack that includes a Non-Access Stratum (NAS) protocol and/or Stream Control Transmission Protocol (SCTP).

MME 250 may implement control plane processing for both the primary access network and the secondary access network. For example, through eNodeB 220, MME 250 may implement tracking and paging procedures for UE 110, may activate and deactivate bearers for UE 110, and may authenticate a user of UE 110 to provide normal coverage service for operating in normal UE device mode. MME 250 may also select a particular SGW 260 for a particular UE 110. MME 250 may interface with other MMEs (not shown) in ePC 210 and may send and receive information associated with UEs 110, which may allow one MME 250 to take over control plane processing of UEs 110 serviced by another MME 250, if the other MME becomes unavailable.

MME 250 may communicate with SGW 260 through an S11 interface 235. S11 interface 235 may be implemented, for example, using GTPv2. S11 interface 235 may be used to create and manage a new session for a particular UE 110. S11 interface 235 may be activated when MME 250 needs to communicate with SGW 260, such as when the particular UE 110 attaches to ePC 210, when bearers need to be added or modified for an existing session for the particular UE 110, when a connection to a new PGW 280 needs to be created, or during a handover procedure (e.g., when the particular UE 110 needs to switch to a different SGW 260).

SGW 260 may provide an access point to and from UE 110, may handle forwarding of data packets for UE 110, and may act as a local anchor point during handover procedures between eNodeBs 220. SGW 260 may interface with PGW 280 through an S5/S8 interface 247. S5/S8 interface 245 may be implemented, for example, using GTP.

HSS 270 may store information associated with UE 110 and/or information associated with users of UE 110. For example, HSS 270 may store user profiles that include registration, authentication, and access authorization information. MME 250 may communicate with HSS 270 through an S6a interface 265. S6a interface 265 may be implemented, for example, using a Diameter protocol. HSS 270 may communicate with I/S CSCF 292 within IMS 140 via a Cx interface 267. Cx interface 257 may be implement using a Diameter protocol.

PGW 280 may function as a gateway to IMS 140 through an SGi interface 255. IMS 140 may provide various services (e.g., IP over multimedia services such over the top voice services) to UE 110. A particular UE 110, while connected to a single SGW 260, may be connected to multiple PGWs 280, one for each packet network with which UE 110 communicates. PGW 280 may exchange information with P-CSCF 295 using the SGi interface 255 based on TCP/IP.

Alternatively, UE 110 may exchange data with WAN 140 though a WiFi wireless access point (WAP) (not shown). The WiFi WAP may be part of a local area network, and access WAN 140 through a wired connection via a router. Alternatively, the WiFi WAP may be part of a mesh network (e.g., 802.11s). The WiFi WAP may operate in accordance with any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. The WiFi WAP may also be part of a wide area network (WiMAX) or a mesh network (802.11s).

PCRF 290 provides policy control decision and flow-based charging control functionalities. PCRF 290 may provide network control regarding service data flow detection, gating, QoS and flow based charging, etc. PCRF 290 may determine how a certain service data flow shall be treated, and may ensure that user plane traffic mapping and treatment are in accordance with a user's subscription profile based, for example, on a specified quality of service (QoS) class identifier (QCI). PCRF 290 may communicate with PGW 280 using a Gx interface 280. Gx interface 280 may be implemented, for example, using a Diameter protocol. PCRF 290 may also interface to P-CSCF 295 using an Rx interface 245. The Rx interface may be used to exchange charging information via a Diameter protocol.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
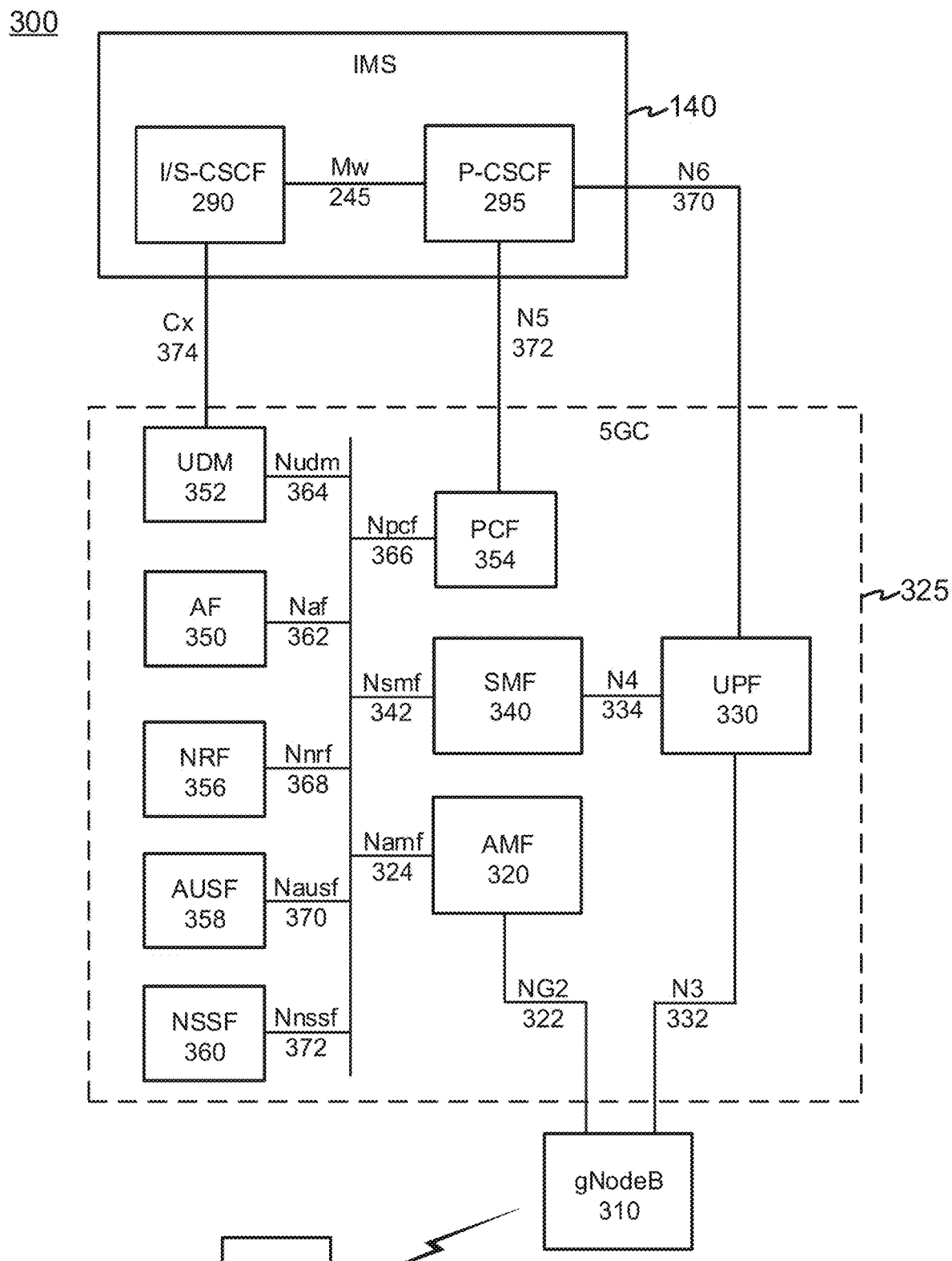
FIG. 3 is a block diagram of an exemplary wireless communication system having a radio access network based on a 5G standard.

FIG. 3 is a block diagram of an exemplary wireless communication system 300 having a radio access network based on a 5G standard. Wireless communication system 300 may include an 5G network with a 5G Core (5GC) 325, gNodeB 310 (corresponding, for example, to CN 130 and BS 120, respectively), UE 110, and IMS 140. UE 110 and gNodeB 310 may exchange data over a radio access technology (RAT) based on 5G air channel interface protocols. Wireless communication system 300 may further include an Internet Protocol (IP) network and/or a non-IP network, which may be embodied separately or included in a backhaul network and/or in a wide area network (not shown). 5GC 325 may also be connected to subsystems in IMS 140. IMS 140 may include various CSCFs, I/S-CSCF 292 and/or P-CSCF 295, which may exchange information via Mw interface 245 using SIP.

5GC 325 may include an Access and Mobility Function (AMF) 320, a User Plane Function (UPF) 330, a Session Management Function (SMF) 340, an Application Function (AF) 350, a Unified Data Management (UDM) 352, a Policy Control Function (PCF) 354, a Network Repository Function (NRF) 356, an Authentication Server Function (AUSF) 358, and a Network Slice Selection Function (NSSF) 360. While FIG. 3 depicts a single gNodeB 310, AMF 320, UPF 330, SMF 340, AF 350, UDM 352, PCF 354, NRF 356, AUSF 358, and/or NSSF 360 for exemplary illustration purposes, in practice, FIG. 3 may include multiple gNodeBs 310, AMFs 320, UPFs 330, SMFs 340, AFs 350, UDMs 352, PCFs 354, NRFs 356, AUSFs 358, and NSSFs 360.

GNodeB 310 may include one or more device, components, and/or functionality that enable UE 110 to wirelessly connect to 5GC 325 using 5G NR RAT. For example, gNodeB 310 may include one or more cells, with each cell site equipment including a wireless transceiver with an antenna array configured for millimeter-wave wireless communication. GNodeB 310 may implement one or more RAN slices to partition 5GC 325. GNodeB 310 may communicate with AMF 320 using an N2 interface 322 and communicate with UPF 330 using an N2 interface 332.

AMF 320 may perform registration management, connection management, reachability management, mobility management, lawful intercepts, Short Message Service (SMS) transport between UE 110 and an SMS function (not shown in FIG. 3), session management messages transport between UE 110 and SMF 340, access authentication and authorization, location services management, functionality to support non-3GPP access networks, and/or other types of management processes. In some implementations, AMF 320 may implement some or all of the functionality of managing RAN slices in gNodeB 310. AMF 320 may be accessible by other function nodes via a Namf interface 324.

UPF 330 may maintain an anchor point for intra/inter-RAT mobility, maintain an external Packet Data Unit (PDU) point of interconnect to a data network (e.g., WAN), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a Radio Access Network (RAN) node (e.g., gNodeB 310), and/or perform other types of user plane processes. UPF 330 may communicate with SMF 340 using an N4 interface 334 and connect to WAN 140 using an N6 interface 336. UPF 330 may communicate with P-CSCF 295 using an N6 interface 370.

SMF 340 may perform session establishment, modification, and/or release, perform IP address allocation and management, perform Dynamic Host Configuration Protocol (DHCP) functions, perform selection and control of UPF 330, configure traffic steering at UPF 330 to guide traffic to the correct destination, terminate interfaces toward PCF 354, perform lawful intercepts, charge data collection, support charging interfaces, control and coordinate of charging data collection, termination of session management parts of network access stratum (NAS) messages, perform downlink data notification, manage roaming functionality, and/or perform other types of control plane processes for managing user plane data. SMF 340 may be accessible via an Nsmf interface 342.

AF 350 may provide services associated with a particular application, such as, for example, application influence on traffic routing, interacting with a policy framework for policy control, and/or other types of applications. AF 350 may be accessible via a Naf interface 362.

UDM 352 may maintain subscription information for UE 110, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data. UDM 352 may be accessible via a Nudm interface 364. UDM 352 may communicate with I/S-CSCF 290 through a Cx interface 374. Cx interface 374 may exchange data pertaining to, for example, user registration, authentication, location, and profile information.

PCF 354 may support policies to control network behavior, provide policy rules to control plane functions (e.g., to SMF 340), access subscription information relevant to policy decisions, execute policy decisions, and/or perform other types of processes associated with policy enforcement. PCF 354 may be accessible via Npcf interface 366. PCF 354 may specify QoS policies based on QoS flow identity (QFI) consistent with 5G network standards. PCF 354 may communicate with P-CSCF 295 via N5 interface 372. N5 interface 372 may exchange data pertaining to for example, quality of service (QoS) information, authorization, and retention priority information.

NRF 356 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 356 may be accessible via an Nnrf interface 368.

AUSF 358 may be located within the home network and provide authentication services for UE 110 and other security related functions for 5GC 325. AUSF 358 may authenticate UE 110 using materials obtained through an Nudm authentication service while using the method specified by the service consumer. Additionally, AUSF 358 may compute keys used to protect the Steering Information List when requested. AUSF 358 may use an Nausf 370 service interface.

NSSF 360 may select a set of network slice instances to serve a particular UE 110, determine network slice selection assistance information (NSSAI), determine a particular AMF 320 to serve a particular UE 110, and/or perform other types of processes associated with network slice selection or management. In some implementations, NSSF 360 may implement some or all of the functionality of managing RAN slices in gNodeB 310. NSSF 360 may be accessible via Nnssf interface 372.

Although FIG. 3 shows exemplary components of 5GC 325, in other implementations, 5GC 325 may include fewer components, different components, differently arranged components, or additional components than depicted in FIG. 3. Additionally or alternatively, one or more components of 5GC 325 may perform functions described as being performed by one or more other components of 5GC 325. For example, 5GC 325 may include additional function nodes not shown in FIG. 3, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 3, additionally or alternatively, 5GC 325 may include a reference point architecture that includes point-to-point interfaces between particular function nodes.

Figure 4:
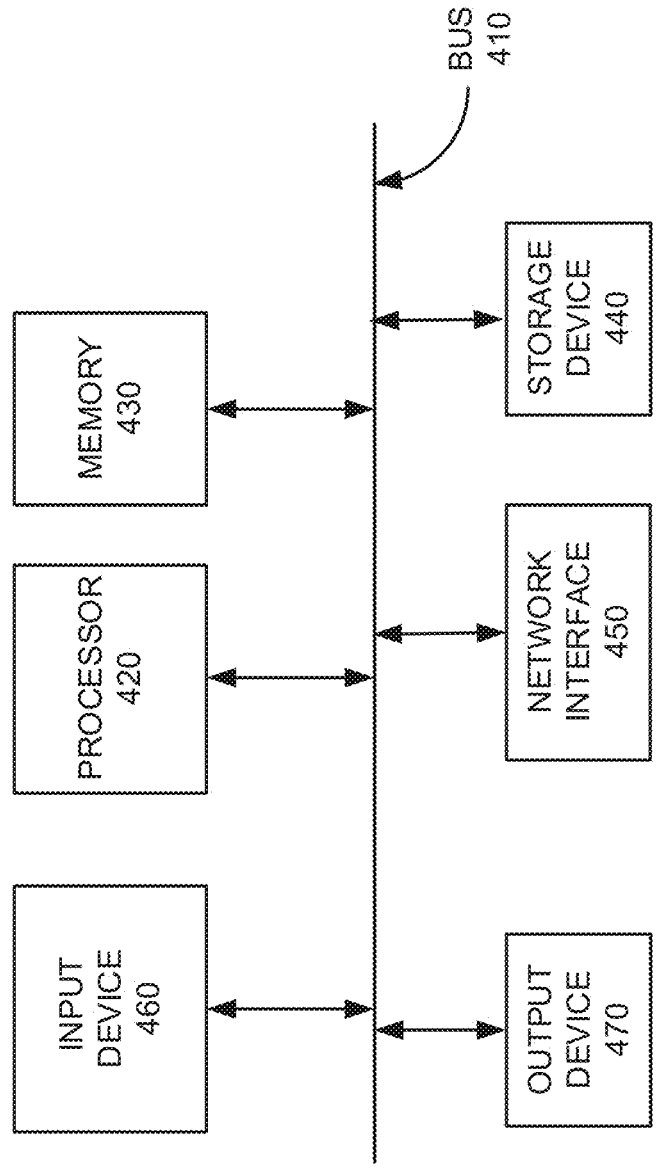
FIG. 4 is a block diagram showing exemplary components of a network device according to an embodiment.

FIG. 4 is a block diagram showing exemplary components of a network device 400 according to an embodiment. Network device 400 may include one or more network elements illustrated in FIGS. 2-3 such as, for example, a UE device 110, a base station 120 (e.g., eNodeB 220 and/or gNodeB 310), elements in ePC 210, elements in 5GC 325, etc. In some embodiments, there may be a plurality of network devices 400 providing functionality of one or more network elements. Alternatively, once network device 400 may perform the functionality of any plurality of network elements. Network device 400 may include a bus 410, a processor 420, a memory 430, storage device 440, a network interface 450, input device 460, and an output device 470.

Bus 410 includes a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux operating systems. Processor 420 may also use high-level analysis software packages and/or custom software written in any programming and/or scripting languages for interacting with other network entities.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. Storage device 440 may include any type of on-board device suitable for storing large amounts of data, and may include one or more hard drives, solid state drives, and/or various types of redundant array of independent disks (RAID) arrays. In an embodiment, storage device 440 may store profile data associated with UEs 110.

Network interface 450 may include a transceiver that enables network device 150 to communicate with other devices and/or systems in network environment 100. Network interface 450 may be configured to exchange data over wired communications (e.g., conductive wire, twisted pair cable, coaxial cable, transmission line, fiber optic cable, and/or waveguide, etc.), or a combination of wired and wireless communications. In other embodiments, network interface 450 may interface with other devices using a wireless communications channel, such as, for example, radio frequency (RF), infrared, and/or visual optics, etc. Network interface 450 may include a transmitter that converts baseband signals to RF signals and/or a receiver that converts RF signals to baseband signals. Network interface 450 may be coupled to one or more antennas for transmitting and receiving RF signals. Network interface 450 may include a logical component that includes input and/or output ports, input and/or output systems, and/or other input and output components that facilitate the transmission/reception of data to/from other devices. For example, network interface 450 may include a network interface card (e.g., Ethernet card) for wired communications and/or a wireless network interface (e.g., a WiFi) card for wireless communications. Network interface 450 may also include a universal serial bus (USB) port for communications over a cable, a Bluetooth® wireless interface, a radio frequency identification device (RFID) interface, a near field communications (NFC) wireless interface, and/or any other type of interface that converts data from one form to another form.

As described below, network device 400 may perform certain operations relating to performing uplink congestion control based on SIP messaging. Network device 400 may perform these operations in response to processor 420 executing software instructions contained in a computer-readable medium, such as memory 430 and/or storage device 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process exemplified by the flow charts shown in FIGS. 5A-5B, and 7 and the signal flows shown in FIGS. 6A-6B, and FIGS. 8A-8B.

Although FIG. 4 shows exemplary components of network device 400, in other implementations, network device 400 may include fewer components, different components, additional components, or differently arranged components than depicted in FIG. 4.

Figure 5A:
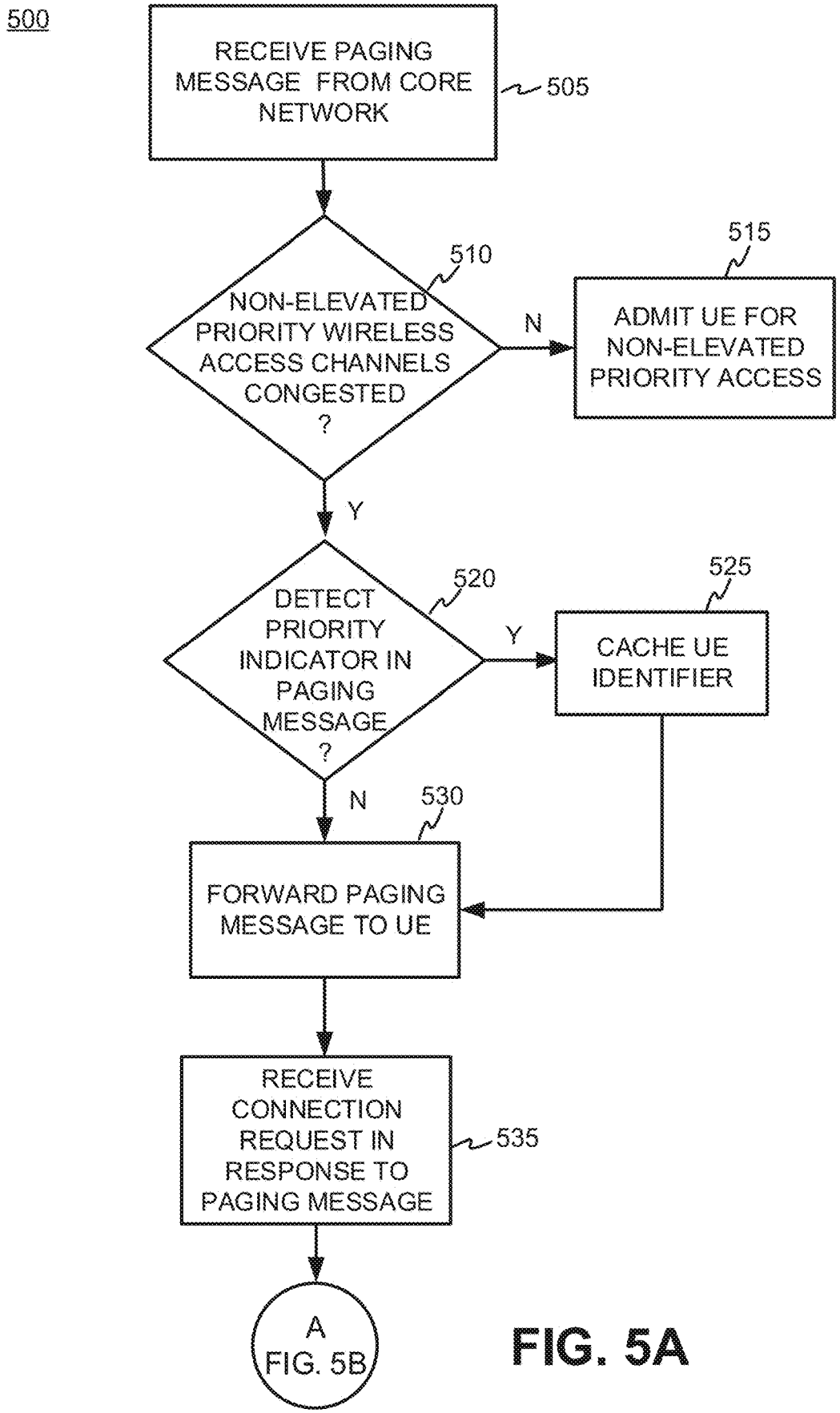
FIGS. 5A-5B show a flow chart of an exemplary process for radio access network (RAN) implemented paging of a UE having non-elevated priority during wireless network congestion.
Figure 5B:
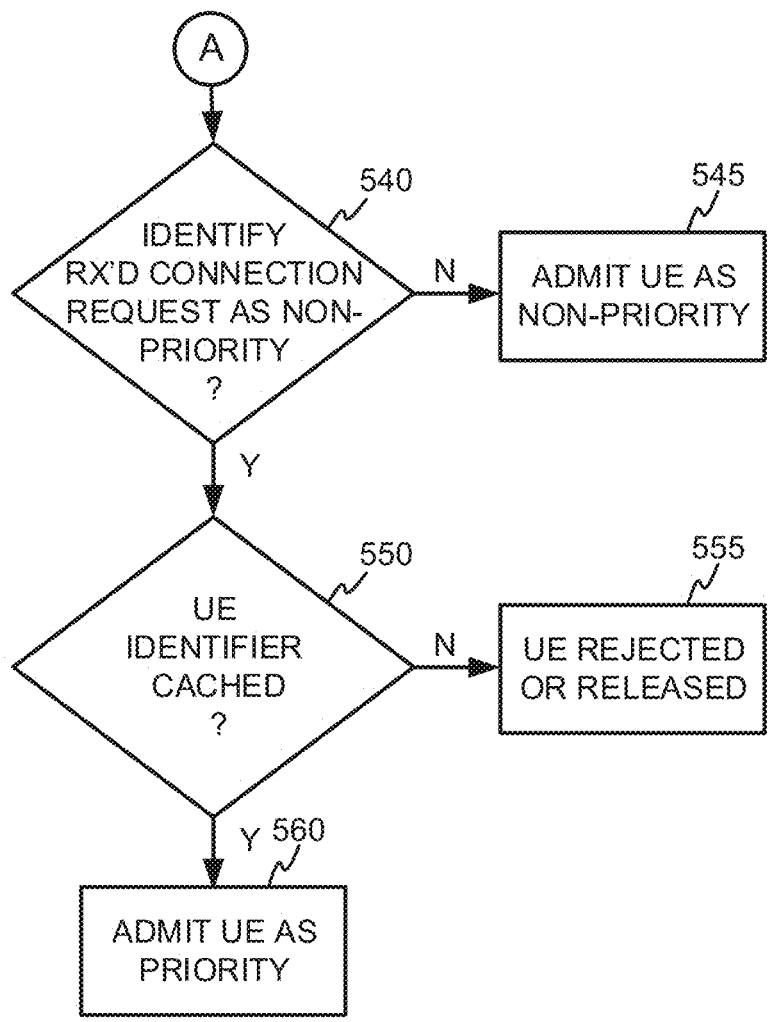

FIGS. 5A-5B show a flow chart of an exemplary process 500 for RAN implemented paging of one of UEs 110-2 through 110-N having non-elevated priority during wireless network congestion. For ease of explanation, the following descriptions of FIGS. 5A through 8B will refer to UE 110-2 from the group of UEs 110-2 through 110-N as having a non-elevated priority status (e.g., non-HPA). However, any one of UEs 110-2 through 110-N may be the recipient of a priority paging message originating from UE 110-1, as set forth below. In an embodiment, process 500 may be performed by a network device 400 using on processor 420. In an embodiment, network device 400 may be base station 120.

Initially, network device 400 may receive, from CN 130, a paging message associated with a priority connection from elevated priority UE 110-1 (Block 505). The paging message may be directed to a non-elevated priority UE 110-2. In an embodiment, UE 110-1 may be associated with an elevated priority service, and the paging message may be a priority paging message. The elevated priority service may be a high priority service that can include a wireless priority service (WPS), a public safety service, a national security service, an emergency preparedness service, etc. The paging message originating from the priority connection established by UE 110-1 may include a priority paging message.

Network device 400 may determine whether non-elevated priority (e.g., normal priority) wireless access channels are congested (Block 510). In an embodiment, determining congestion may include ascertaining whether a threshold for a non-elevated priority bearer channel has been exceeded. Additionally or alternatively, congestion may be ascertained by determining whether resource usage associated with a radio resource control layer have been exhausted or exceeded. If in Block 510 network device 400 determines that the non-elevated priority wireless access channels are not congested (Block 510—no), network device 400 may admit UE 110-2 for non-elevated priority access (Block 515).

If in Block 510 network device 400 determines that the non-elevated priority wireless access channels are congested (Block 510—yes), network device 400 may then proceed to Block 520. In block 520, network device 400 may detect a priority indicator in the paging message received from CN 130. If the priority indicator is detected in Block 520 (Block 520—yes), network device 400 may cache the identifier of the UE 110-2, which may be specified in the paging message received from CN 130 (Block 525). In an embodiment, the identifier of UE 110-2 may be, for example, specified as the Serving Temporary Mobile Subscriber Identity (S-TMSI) of UE 110-2. Once the identifier of UE 110-2 is cached, network device 400 will forward the paging message to UE 110-2 (Block 530). Alternatively, if network device 400 does not detect the priority indicator of the paging message in Block 520, the identifier parameter of UE 110-2 may not be cached, and the paging message may be forwarded to UE 110-2 (Block 530). UE 110-2 will process the paging message, and in response, generate and send a connection request back to network device 400. In an embodiment, UE 110-2 may send a radio resource control (RRC) connection request.

Network device 400 may receive the connection request from UE 110-2 (Block 535), and identify whether the received connection request is a non-priority connection request (Block 540). If network device 400 identifies a non-priority connection request, network device 400 will admit UE 110-2 to the RAN 115 with a non-priority status (Block 545). Alternatively, if in Block 540 network device 400 determines the received connection request is a priority request (Block 540—yes), then network device 400 may determine if the UE identifier was previously cached (Block 550). If the UE identifier was previously cached (Block 550—yes), then network device 400 will admit UE 110-2 with an elevated priority status (560). If the UE 110-2 identifier was not cached (Block 550—no), the UE 110-2 will be rejected (not admitted to RAN 115) or released (Block 555). When UE 110-2 is granted priority status, the RRC connection request and associated bearers are granted elevated priority for the duration of the session.

Figure 6A:
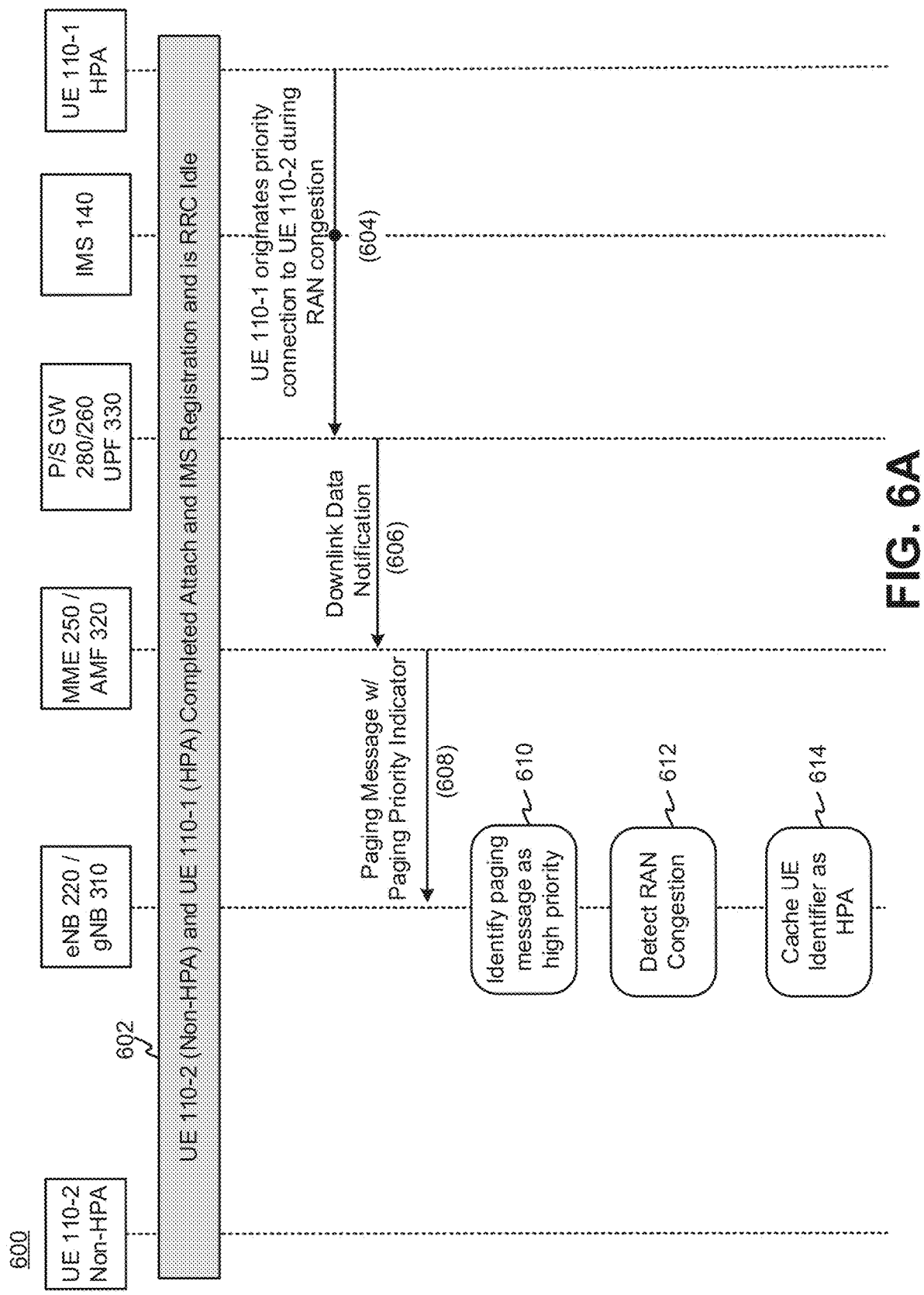

FIGS. 6A-6B are diagrams showing exemplary message flows within a wireless communication system 200 and/or 300 for RAN implemented paging of a UE having non-elevated priority during wireless network congestion. The message flow diagrams show network components which may correspond to both LTE and 5G network standards. The LTE components are shown with the label "2XX" and the 5G components are shown with the label "3XX." For example, as shown in FIGS. 6A-6B, the base station elements are shown as "eNode 220/gNode 310," the mobility managers are shown as "MME 250/AMF 320," etc.

In FIG. 6A, flow diagram 600 initially shows UE 110-1 and UE 110-2 as having completed an attachment and registration procedure and are both in an RCC Idle state (602). In the embodiment shown in FIG. 6A, UE 110-2 is associated with a non-HPA status (i.e., a non-elevated or "normal" priority status), and UE 110-1 is associated with an HPA status (i.e., an elevated priority status). UE 110-1 may originate a priority connection to UE 110-2 during a period of congestion on the RAN (604). A priority connection request is sent from UE 110-1 to PGW 280/SGW 260 or UPF 330. The connection request may be provided via IMS 140. PGW 280/SGW 260 or UPF 330 may then send a downlink data notification to MME 250 or AMF 320 (606). The downlink data notification may also include a message or signal for a high priority allocation and retention priority (ARP) status. MME 230/AMF 320 may generate and send to eNB 220/gNB 310 a paging message with a paging priority indicator (indicating an elevated priority), and an s-TMSI value indicating the identity of UE 110-2 (608). Upon receiving the paging message (608), eNB 220/gNB 310 may identify the paging message as high priority (Block 610), detect RAN congestion (Block 612), and in response, cache the identifier (e.g., s-TMSI) of UE 110-2 as HPA (e.g., elevated priority).

Further referring to FIG. 6B, eNB 230/gNB 310 may send a paging message to UE 110-2 (620). In response, UE 110-2 may send an RRC connection request back to eNB 220/gNB 310 (622). ENB 220/gNB 310 may check a local cache for a match of the identifier (e.g., s-TMSI value) associated with UE 110-2 as provided in the RRC connection request. When a match is found, eNB 220/gNB 310 may recognize UE 110-2 as having an HPA status (e.g., elevated priority) and admit UE 110-2 to RAN 115, and establish a bearer for data communication (624). Once the bearer is established by MME 230/AMF 320, UE 110-2 may establish priority communications with UE 110-1 (628).

Figure 7:
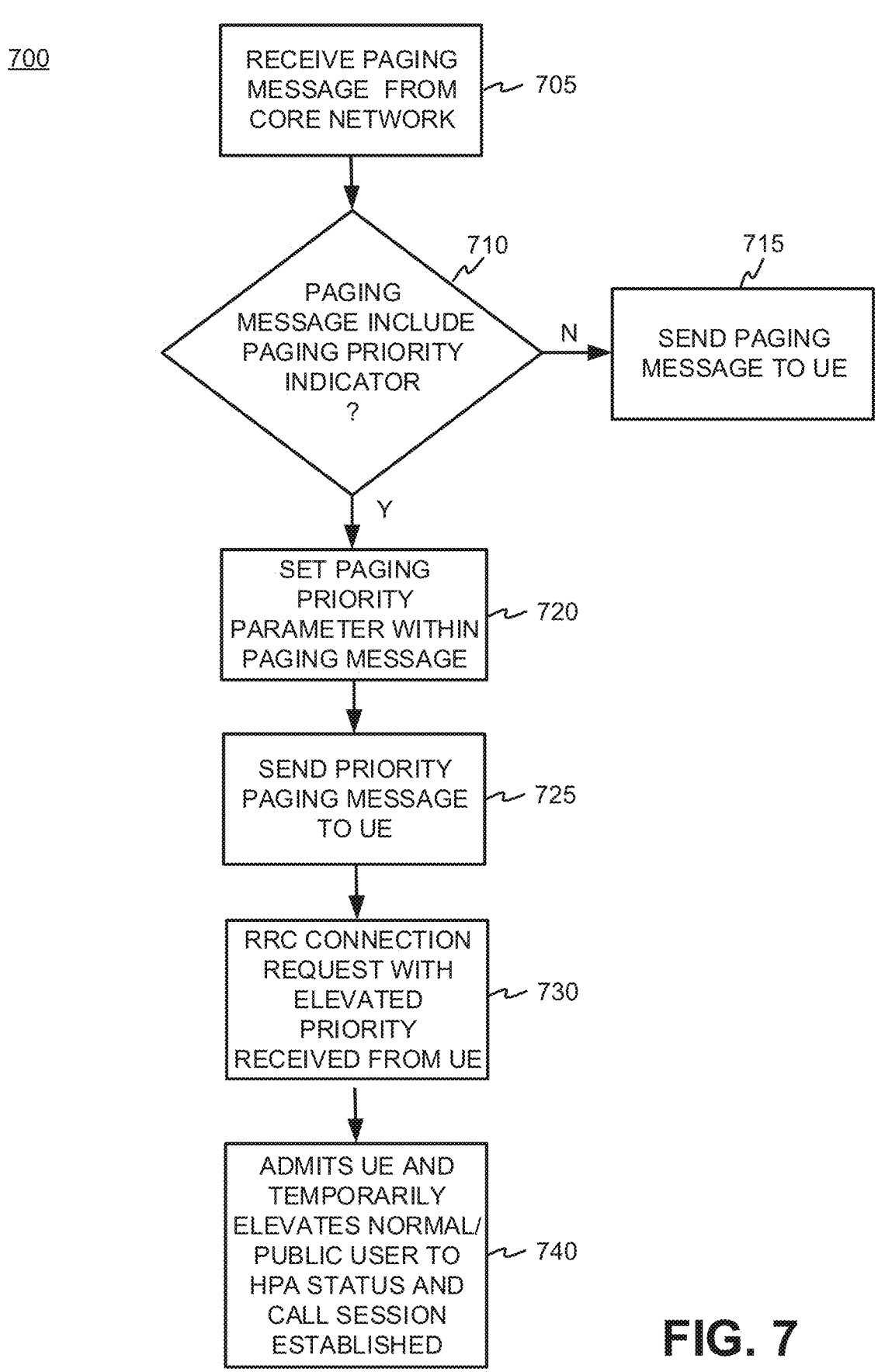
FIG. 7 shows a flow chart of an exemplary process for a combination RAN and UE implementation for paging of a UE having non-elevated priority during wireless network congestion.

FIG. 7 shows a flow chart of an exemplary process 700 for a combination RAN and UE implementation for paging of a UE having non-elevated priority during wireless network congestion. In an embodiment, process 700 may be performed by a network device 400 using processor 420, where network device 400 may be base station 120.

Initially, network device 400 may receive, from CN 130, a paging message associated with a priority connection from elevated priority UE 110-1 (Block 705). The paging message may be directed to non-elevated priority UE 110-2. As noted in FIG. 5A above, UE 110-1 may be associated with an elevated priority service, and the paging message may be a priority paging message. The elevated priority service may be a high priority service that can include a WPS, a public safety service, a national security service, an emergency preparedness service, etc. The paging message sent by UE 110-1 may include a priority paging message.

Network device 400 may determine whether the paging message includes a paging priority indicator (designating an elevated priority, such as, for example, HPA) (710). If network device 400 determines paging messages does not have a paging priority indicator (Block 710—no), network device 400 may send the paging message to UE 110-2 (Block 715). Alternatively, if network device 400 determines the paging message includes a paging priority indicator (Block 710—yes), network device 400 may set a paging priority parameter withing the paging message (720). In an embodiment, setting the paging priority parameter may be performed by setting a single bit in the paging message.

Network device 400 may then send the priority paging message to UE 110-2 via RAN 115 (725). In response, UE 110-2 may generate and send an RRC connection request to network device 400 (730). Network device 400 may receive the RRC connection request with an HPA status. In this case, UE 110-2, which was in an Idle RRC state, temporarily elevates the priority of the RRC connection and the bearer channels, and transmits the RRC connection request with elevated priority (e.g., HPA) status. Network device 400, upon receiving RRC connection request with elevated priority status, admits UE 110-2 and temporally elevates the normal/public user to elevated priority status (e.g., HPA) prior to establishing a call session (740).

Figure 8A:
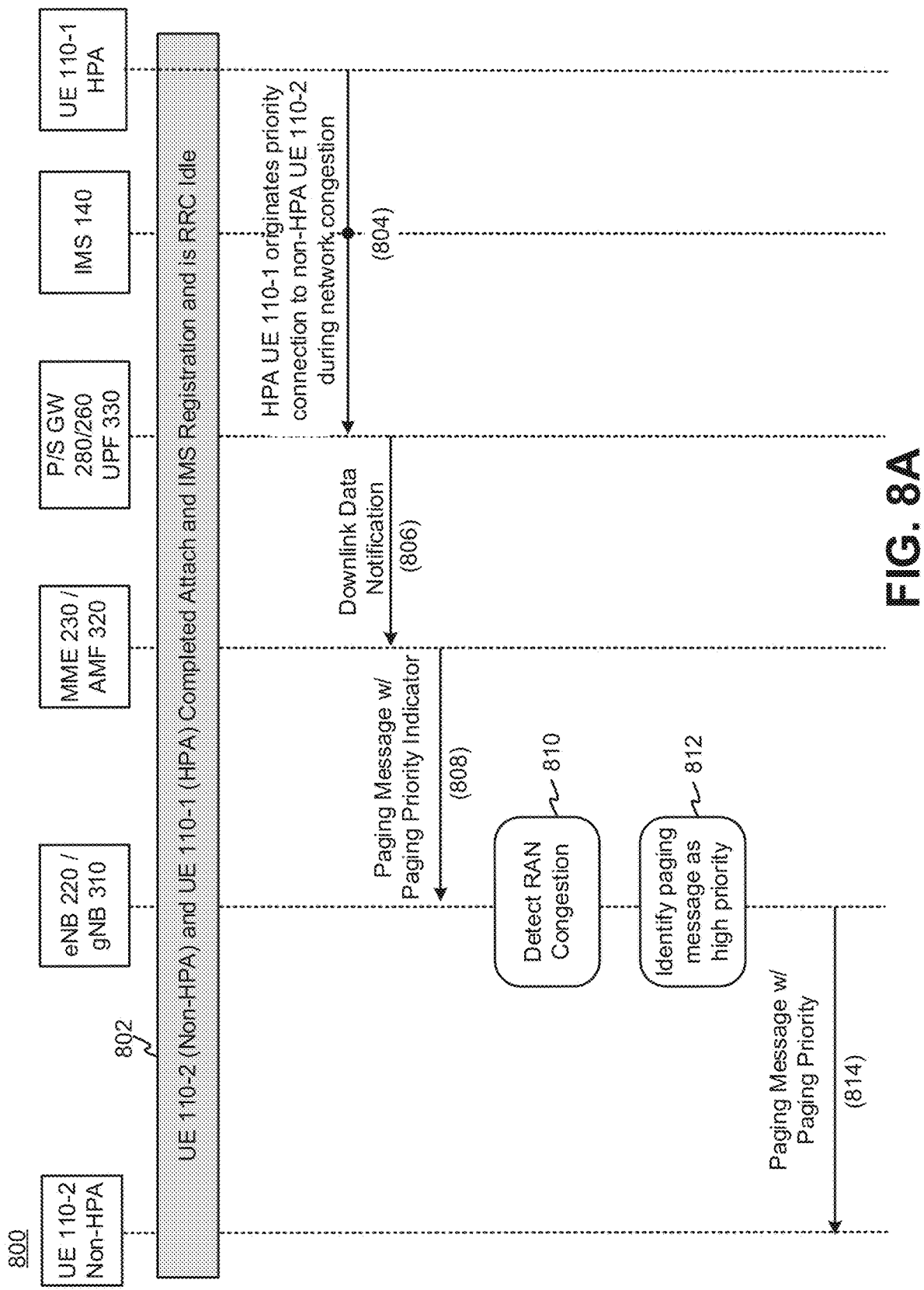
FIGS. 8A-8B are diagrams showing exemplary message flows within a wireless communication system for a RAN implemented paging of a UE having non-elevated priority during wireless network congestion.
Figure 8B:
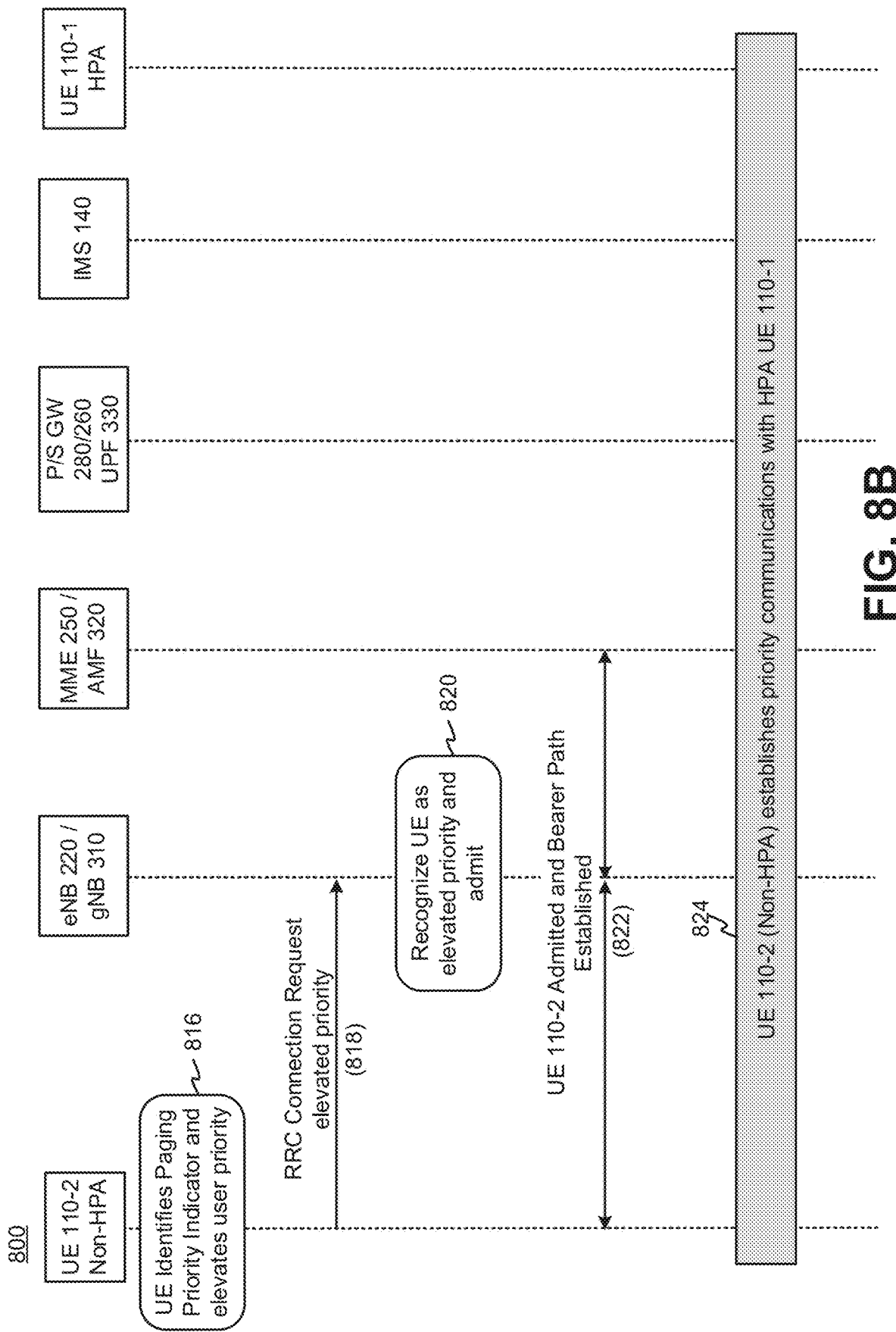

FIGS. 8A-8B are diagrams showing exemplary message flows within a wireless communication system 200 and/or 300 for RAN implemented paging of a UE having non-elevated priority during wireless network congestion. The message flow diagrams show network components which may correspond to both LTE and 5G network standards. As noted above, the LTE components are shown with the label "2XX" and the 5G components are shown with the label "3XX." For example, as shown in FIGS. 8A-8B, the base station elements are shown as "eNode 220/gNode 310," the mobility managers are shown as "MME 250/AMF 320," etc.

In FIG. 8A, flow diagram 600 initially shows UE 110-1 and UE 110-2 as having completed an attachment and registration procedure and are both in an RCC Idle state (802). In the embodiment shown in FIG. 8A, UE 110-2 is associated with a non-HPA status (i.e., a non-elevated or "normal" priority status), and UE 110-1 is associated with an HPA status (i.e., an elevated priority status). UE 110-1 may originate a priority connection to UE 110-2 during a period of congestion on the RAN (804). A priority connection request is sent from UE 110-1 to PGW 280/SGW 260 or UPF 330. The connection request may be provided via IMS 140. PGW 280/SGW 260 or UPF 330 may then send a downlink data notification to MME 250 or AMF 320 (806). The downlink data notification may also include a message or signal for a high priority allocation (HPA) and retention priority (ARP) status. MME 250/AMF 320 may generate and send to eNB 220/gNB 310 a paging message with a paging priority indicator (indicating an elevated priority), and an s-TMSI value indicating the identity of UE 110-2 (808). Upon receiving the paging message (808), eNB 220/gNB 310 may detect RAN congestion (Block 810), and identify the paging message as having a high priority status (812). ENB 220/gNB 310 may send a paging message, along with a paging priority, via RAN 115, to UE 110-2. In an embodiment, the paging priority may be indicated as a parameter in the paging message having a 1-bit value.

Further referring to FIG. 8B, UE 110-2 may identify the paging priority indicator and elevate the user priority (816). Subsequently, UE 110-2 provides an RRC connection request to eNB 220/gNB 310 having an elevated priority status (e.g., HPA) (810). eNB 220/gNB 310 may recognize the UE 110-2 as having elevated priority, based upon the parameter in the RRC connection request, and admit UE 110-2 as an priority user (820). UE 110-2 may then be admitted to RAN 115, and a bearer path can be established (822). UE 110-2 may then establish priority communications with UE 110-1 (824).

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5A, 5B and 7, message flows with regard to FIGS. 6A-6B and 8A-8B the order of the blocks and message may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    receiving, at a base station and from a core network, a paging message associated with a priority connection from a first user equipment device (UE) having an elevated priority status, to a second UE having a non-elevated priority status;
    determining, at the base station, that non-elevated priority wireless access channels are congested;
    detecting, at the base station, a priority indicator within the received paging message in response to determining that the non-elevated priority wireless access channels are congested;
    caching, at the base station, an identifier of the second UE in response to detecting the priority indicator in the received paging message; and
    establishing a wireless connection between the first UE and the second UE upon verifying that the identifier of the second UE has been cached.

2. The method of claim 1, wherein determining that the non-elevated priority wireless access channels are congested comprises:
    determining, for a non-elevated priority bearer channel, that a traffic threshold has been exceeded or resources associated with a radio resource control layer have been exhausted or exceeded.

3. The method of claim 2, wherein the establishing a wireless connection further comprises:
    raising the status of the second UE from non-elevated priority to an elevated priority; and
    elevating the non-elevated priority bearer channel to a priority bearer channel for a duration of a session between the first UE and the second UE.

4. The method of claim 1, wherein establishing the wireless connection further comprises:
    forwarding, from the base station, the paging message to the second UE; and
    receiving, at the base station, a connection request from the second UE in response to the forwarded paging message.

5. The method of claim 4, wherein establishing the wireless connection further comprises:
    identifying, at the base station, that the received connection request from the second UE has a non-elevated priority status;
    determining whether the identifier of the second UE has been cached; and
    admitting, by the base station, the second UE to the wireless connection with elevated priority status in response to determining the identifier of the second UE was cached.

6. The method of claim 5, further comprising:
    rejecting the second UE in response to determining that the identifier of the second UE was not cached.

7. The method of claim 1, wherein the first UE is associated with a high priority access (HPA) service comprising at least one of wireless priority service (WPS), a public safety service, a national security service, or an emergency preparedness service, and the second UE is associated with a normal priority service.

8. A network device, comprising:
    a communication interface; and
    a processor coupled to the communication interface, wherein the processor is configured to:
        receive, from a core network, a paging message associated with a priority connection from a first user equipment device (UE) having an elevated priority status, to a second UE having a non-elevated priority status;
        determine that non-elevated priority wireless access channels are congested;
        detect a priority indicator within the received paging message in response to determining that the non-elevated priority wireless access channels are congested;
        cache an identifier of the second UE in response to detecting the priority indicator in the received paging message; and
        establish a wireless connection between the first UE and the second UE upon verifying that the identifier of the second UE has been cached.

9. The network device of claim 8, wherein upon determining that the non-elevated priority wireless access channels are congested, the processor is further configured to:
    determine, for a non-elevated priority bearer channel, that a traffic threshold has been exceeded or resources associated with a radio resource control layer have been exhausted or exceeded.

10. The network device of claim 9, wherein upon establishing a wireless connection, the processor is further configured to:
    raise the status of the second UE from non-elevated priority to an elevated priority; and
    elevate the non-elevated priority bearer channel to a priority bearer channel for a duration of a session between the first UE and the second UE.

11. The network device of claim 8, wherein upon establishing a wireless connection, the processor is further configured to:
    forward the paging message to the second UE; and
    receive a connection request from the second UE in response to the forwarded paging message.

12. The network device of claim 11, wherein upon establishing a wireless connection, the processor is further configured to:
    identify that the received connection request from the second UE has a non-elevated priority status;
    determine whether the identifier of the second UE has been cached; and
    admit the second UE to the wireless connection with elevated priority status in response to determining the identifier of the second UE was cached.

13. The network device of claim 11, wherein the processor is further configured to:
    reject the second UE in response to determining that the identifier of the second UE was not cached.

14. The network device of claim 8, wherein the first UE is associated with a high priority access (HPA) service comprising at least one of wireless priority service (WPS), a public safety service, a national security service, or an emergency preparedness service, and the second UE is associated with a normal priority service.

15. A non-transitory computer-readable medium comprising instructions, which, when executed by a processor, cause the processor to:
  receive, at a base station and from a core network, a paging message associated with a priority connection from a first user equipment device (UE) having an elevated priority status, to a second UE having a non-elevated priority status;
  determine that non-elevated priority wireless access channels are congested;
  detect a priority indicator within the received paging message in response to determining that the non-elevated priority wireless access channels are congested;
  cache an identifier of the second UE in response to detecting the priority indicator in the received paging message; and
  establish a wireless connection between the first UE and the second UE upon verifying that the identifier of the second UE has been cached.

16. The non-transitory computer-readable medium of claim 15, wherein the instructions to determine that the non-elevated priority wireless access channels are congested further cause the processor to:
  determine, for a non-elevated priority bearer channel, that a traffic threshold has been exceeded or resources associated with a radio resource control layer have been exhausted or exceeded.

17. The non-transitory computer-readable medium of claim 16, wherein the instructions to establish a wireless connection further cause the processor to:
  raise the status of the second UE from non-elevated priority to an elevated priority; and
  elevate the non-elevated priority bearer channel to a priority bearer channel for a duration or a session between the first UE and the second UE.

18. The non-transitory computer-readable medium of claim 15, wherein the instructions to establish a wireless connection further cause the processor to:
  forward the paging message to the second UE; and
  receive a connection request from the second UE in response to the forwarded paging message.

19. The non-transitory computer-readable medium of claim 18, wherein the instructions to establish a wireless connection further cause the processor to:
  identify that the received connection request from the second UE has a non-elevated priority status;
  determine whether the identifier of the second UE has been cached; and
  admit the second UE to the wireless connection with elevated priority status in response to determining the identifier of the second UE was cached.

20. The non-transitory computer-readable medium of claim 18, wherein the processor is further configured to:
  reject the second UE in response to determining that the identifier of the second UE was not cached.

* * * * *